Patented Oct. 9, 1934

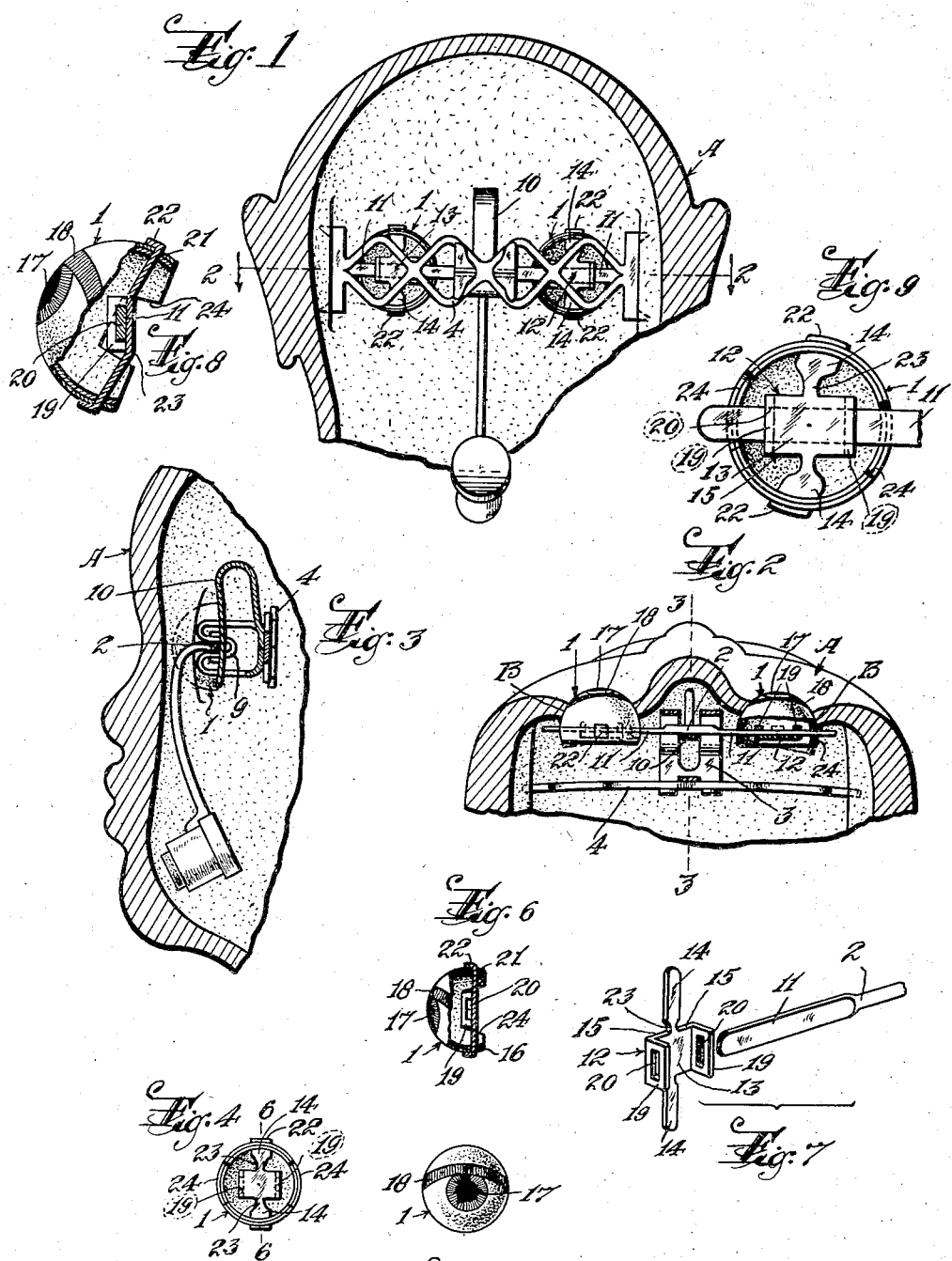

1,976,370

UNITED STATES PATENT OFFICE 1,976,370

EYE MEMBER MOUNTING FOR DOLLS

Nicholas Popovich, Teaneck, N. J., assignor of one-third to Joseph A. Taferner and one-third to Leo J. Schlitzer, both of New York, N. Y.

Application September 18, 1933, Serial No. 689,901

2 Claims. (Cl. 46—40)

This invention relates in general to eye sets for dolls and artificial figures including eye members which are mounted within the head of a doll or the like to rotate in eye openings or sockets and simulate natural movements of the eyes as in opening and closing thereof. Such eye sets usually include eye members and a mounting mechanism for securing the eye members in a doll head in proper relation to the eye openings in the head.

As is known to those skilled in the art the eye sockets in different doll heads frequently have different relations to each other, sometimes being spaced apart different distances and in other cases being slightly out of horizontal alinement in the head; and many times in placing the eye mountings in the head the eye members are initially located in such relation to the eye sockets that the representations of the pupil and iris in the eye members do not properly register with the eye openings. Under such circumstances much time, trouble and expense are required to properly readjust and attach the eye mountings to the heads.

One object of my invention is to provide novel and improved means for attaching eye members to the eye mountings whereby the eye members can be easily and quickly adjusted on the mounting and to the eye openings in the head by simply manually twisting the eye member in various directions on the mounting and without danger of injury to the eye members of the mounting.

Another object is to provide a novel and improved means for connecting the eye member to the yoke rod of an eye mounting mechanism including a coupler to be connected to said yoke rod and the eye member and so formed that the coupler can be easily bent or twisted in a plurality of different directions so as to permit a wide range of variation in the relation of the eye member to the yoke rod and adjust the eye member into proper register with the eye opening in a doll head.

Other objects are to provide means of the character described comprising a coupler having a body and a plurality of radiating arms some of which are formed to be connected to said yoke rod while others are connected to the eye member and are cut away at their juncture with said body so as to be easily bendable or twistable by simply turning the eye member in various directions relative to the yoke rod, whereby the eye member can be easily adjusted to properly register with an eye opening in a doll head; to provide such means which shall be reliable, durable and inexpensive and to obtain other advantages and results as will be brought out by the following description.

Referring to the accompanying drawing in which corresponding and like parts are designated by the same reference characters throughout the several views, Figure 1 is a rear elevation of an eye set embodying my invention showing it in a doll head which is illustrated in vertical section.

Figure 2 is a horizontal sectional view on the line 2—2 of Figure 1.

Figure 3 is a transverse vertical sectional view on the line 3—3 of Figure 2.

Figure 4 is a detached rear elevation of one of the eye members.

Figure 5 is a front elevation of the eye member.

Figure 6 is a transverse sectional view on the line 6—6 of Figure 4.

Figure 7 is a composite perspective view of one of the couplers and the corresponding end of the yoke rod.

Figure 8 is an enlarged transverse sectional view through the eye member and the corresponding end of the yoke rod showing one adjustment of the eye member, and Figure 9 is an enlarged rear elevation of an eye member and one end of the yoke rod showing another adjustment of the eye member.

Specifically describing the illustrated embodiment of the invention, the reference character A designates a doll head of known construction which is formed of penetrable material and has the usual eye sockets B in the face portion thereof. In each of the eye sockets is arranged an eye member 1 mounted to rotate to simulate opening and closing of the eyes, these eye members being mounted on a yoke member or rod 2 which is in turn pivotally mounted in a bracket 3 which is secured on a supporting member or bar 4.

The supporting bar is shown of the form described and claimed in my copending application Serial No. 672,116 and includes a flat strip of ductile metal having end sections 5 which are provided with integral prongs 6 for penetrating the material of the doll head. The intermediate or central section 7 of the bar is extensible so that the bar can be mounted in the head by simply longitudinally extending the bar and simultaneously forcing the prongs 6 into the head.

The bracket 3 for supporting the yoke member 2 is of the form described in my said copending application and has a reentrant groove 9 which serves as a bearing for the yoke member 2. As shown, the bracket 3 also has a spring tongue 10 arranged behind the yoke member for normally influencing the latter toward the face of the doll head.

The yoke member 2 is in the form of a rod having its end portions flattened or polygonal in cross section as indicated at 11 and disposed in axial alinement with each other, the flat ends of the yoke member serving to slidably support the eye members 1. Each eye member includes a shell 16 consisting of substantially a hollow hemisphere which has a representation 17 of a pupil and iris on its spherical surface above which is preferably provided a representation of eyelashes 18.

The present invention relates particularly to the means for connecting the eye members to the yoke member, and as shown, this means comprises a coupler 12, preferably formed of a single piece of ductile sheet metal and including a body 13 and two pairs of radiating arms 14 and 15. The coupler 13 is connected to the eye member with the arms of each pair disposed diametrically of the shell 16. The arms 15 have ears 19 approximately perpendicular to the plane of the arms 15 and provided with alined openings 20 to nicely slidably receive one end 11 of the yoke member 2. The other arms 14 extend through slots 21 in the shell 16 and the extremities of the arm are clinched over the shell as at 22 for connecting the coupler to the shell. The coupler thereby can be easily and quickly connected to the shell and by sliding the arms 14 relative to the shell before clinching of the extremities of the arm, the shell can be accurately located with its axis in the desired relation to the axis of the yoke member 2. When the arms 14 are unbent they are disposed in a common plane and extend from said coupler in a direction perpendicular to the axis of the yoke rod in which position the shell can be readily positioned thereon to be positively connected thereto, while the arms 15 are slidably connected to the yoke and are disposed in a common plane approximately parallel to the axis of the yoke member 2. The arms 14 are relatively weaker than the arms 15, or the arms 14 may be provided with reduced or weakened portions 23, so that the arms 14 may be bent or twisted by manually turning the shell 16 and without bending of or injury to the other parts of the coupler or the mounting. To provide a clearance for such turning of the shell the edges of the shell are preferably formed with notches 24 through which the end portion 11 of the yoke rod may extend.

In assembling the eye set in a doll head the bracket 3 is attached to the supporting bar 4 and the eye members are connected to the yoke rod 2 by slipping the end portions 11 of the yoke rod through the openings 20 of the couplers 12. Then the yoke rod 2 is slipped into the groove 9 of the bracket, after which the eye members are set in the eye sockets B and the supporting bar 4 is secured in the body. The spring 10 yieldingly influences the eye members into the eye sockets and the eye members may longitudinally slide on the yoke rod to adjust themselves to various distances between the eye sockets and to permit them to find their own axes of rotation in the eye sockets. Should the eye members improperly register with the eye openings, the eye members may be adjusted by simply manually turning them, the arms 14 yielding under such manual force as shown in Figures 2, 8 and 9. For example, should the pupil and iris representation 17 initially face other than straight ahead in the eye socket, the eye member may be rotated about the vertical axes provided by the arms 14, as shown by dot and dash lines in Figure 2. Should the eyelash representation 18 fail to properly register with the edges of the eye opening, the eye member may be rotated about its own axis by bending of the arms 14 as shown in Figure 9, while should the pupil and iris representation 17 be located too high or too low in the eye opening, the eye member may be rotated about an axis parallel with that of the yoke rod by bending of the arms 14 as shown in Figure 8.

My invention therefore makes possible a wide range of variation in the adjustment of the relation of the eye member to the yoke rod and to the eye openings by the simple and easy bending or twisting of the arms 14 in a plurality of different directions.

I am aware that it is not broadly new to manually twist or bend eye members mounted to adjust eye members on mounted mechanisms, but my invention provides a simple, reliable and durable structure by which a wider range of adjustment can be obtained than with prior devices known to me.

However, while I have shown my invention as embodied in certain details of construction it should be understood that the details of structure may be modified and changed by those skilled in the art without departing from the spirit or scope of the invention.

Having thus described my invention, what I claim is:

1. In an eye mounting, the combination with a yoke rod having a portion to receive an eye member, of an eye member comprising a substantially hemispherical hollow shell, and a coupler for connecting said shell to said yoke rod including a member having a body and two pairs of radiating arms, the arms of each pair being disposed diametrally of said shell, and the arms of one pair having weakened portions to facilitate bending and when unbent lying in a common plane and extending from said coupler in a direction perpendicular to the axis of said yoke rod, said shell having diametrically opposite slots and the first-mentioned arms of the coupler extending through said slots and being clinched over the exterior of the shell to connect the coupler to the shell, while the arms of the other pair are connected to said yoke rod to slide longitudinally thereof, said weakened portions rendering the first-mentioned pairs of arms more readily bendable than the other pair, whereby said shell can be adjusted into various relations to said yoke rod by manually turning the shell to bend said bendable arms.

2. In an eye mounting, the combination with a yoke rod having a portion to receive an eye member, of an eye member comprising a substantially hemispherical hollow shell, and a coupler for connecting said shell to said yoke rod including a member having a body and two pairs of radiating arms, the arms of each pair being disposed diametrally of said shell and the arms of one pair being positively connected to the shell, while the arms of the other pair are connected to said yoke to slide longitudinally thereof, the arms of the first-mentioned pair having cut away portions at their juncture with said body, said cut away portions rendering said first-mentioned arms more readily bendable and in various directions than the other pair whereby said shell can be adjusted into various relations to said yoke by manually turning the shell to bend said bendable arms and said bendable arms when unbent lying in a common plane and extending from said coupler in a direction perpendicular to the axis of said yoke rod.

NICHOLAS POPOVICH.